United States Patent
Azam et al.

(10) Patent No.: US 11,762,796 B2
(45) Date of Patent: Sep. 19, 2023

(54) BINDING DOWNSTREAM USB PORTS TO UPSTREAM USB PORTS

(71) Applicant: Hewlett-Packard Development Company, L.P., Spring, TX (US)

(72) Inventors: Syed S. Azam, Spring, TX (US); Alexander Williams, Spring, TX (US); John W. Frederick, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/419,318

(22) PCT Filed: Jul. 25, 2019

(86) PCT No.: PCT/US2019/043485
§ 371 (c)(1),
(2) Date: Jun. 29, 2021

(87) PCT Pub. No.: WO2021/015791
PCT Pub. Date: Jan. 28, 2021

(65) Prior Publication Data
US 2022/0147477 A1    May 12, 2022

(51) Int. Cl.
*G06F 13/20*    (2006.01)
*G06F 13/38*    (2006.01)
*G06F 13/42*    (2006.01)

(52) U.S. Cl.
CPC ........ *G06F 13/382* (2013.01); *G06F 13/4282* (2013.01); *G06F 2213/0042* (2013.01)

(58) Field of Classification Search
None
See application file for complete search history.

(56) References Cited

U.S. PATENT DOCUMENTS

| | | | |
|---|---|---|---|
| 6,532,512 B1 * | 3/2003 | Torii | G06F 13/4022 710/316 |
| 7,769,940 B2 * | 8/2010 | Wiler | G06F 3/023 710/316 |
| 8,387,043 B2 | 2/2013 | Tanaka et al. | |
| (Continued) | | | |

OTHER PUBLICATIONS

Avitech International Corporation, Sequoia Dual, 2017, Retrieved Mar. 29, 2019, 10 pages, available at: avitechvideo.com/portfolio/sequoia-dual/.

*Primary Examiner* — Henry Tsai
*Assistant Examiner* — Dean Phan
(74) *Attorney, Agent, or Firm* — QUARLES & BRADY LLP (57) ABSTRACT

According to examples, an apparatus may include a processor that may access an assignment of a component connected to a downstream USB port, from among a plurality of downstream USB ports that are downstream of a display device, to a first physical host device from among a plurality of physical host devices connected to the display device via respective upstream USB ports. The apparatus may bind, based on the assignment, the downstream USB port to a first upstream USB port that connects the first physical host device to the display device. The binding may cause the component to be coupled to the first physical host device. The apparatus facilitates assignment of individual components connected to downstream USB ports to one of a plurality of upstream USB ports.

14 Claims, 7 Drawing Sheets

(56) References Cited

U.S. PATENT DOCUMENTS

| | | | |
|---|---|---|---|
| 8,646,028 B2 | 2/2014 | McKenzie et al. | |
| 9,766,913 B2 | 9/2017 | Moran et al. | |
| 2005/0216620 A1* | 9/2005 | Sandulescu | G06F 3/038 |
| | | | 710/62 |
| 2010/0180055 A1 | 7/2010 | Lyon et al. | |
| 2011/0161405 A1* | 6/2011 | He | H04L 41/042 |
| | | | 709/227 |
| 2011/0320639 A1 | 12/2011 | Ulenas | |
| 2015/0356045 A1 | 12/2015 | Soffer | |
| 2016/0005378 A1* | 1/2016 | Abe | G06F 3/14 |
| | | | 345/520 |
| 2019/0146664 A1 | 5/2019 | Guynes et al. | |

* cited by examiner

NON-TRANSITORY MACHINE-READABLE STORAGE MEDIUM
700

DETECT A PLURALITY OF COMPONENTS CONNECTED TO RESPECTIVE ONES OF A PLURALITY OF DOWNSTREAM USB PORTS
702

DETECT A PLURALITY OF PHYSICAL HOST DEVICES CONNECTED TO RESPECTIVE ONES OF A PLURALITY OF UPSTREAM USB PORTS
704

GENERATE A GRAPHICAL USER INTERFACE (GUI) THAT DISPLAYS RESPECTIVE GRAPHICAL REPRESENTATIONS OF THE PLURALITY OF COMPONENTS AND RESPECTIVE SECOND GRAPHICAL REPRESENTATIONS OF THE PLURALITY OF PHYSICAL HOST DEVICES
706

ACCESS AN INDICATION THAT A GRAPHICAL REPRESENTATION OF A COMPONENT FROM AMONG THE PLURALITY OF COMPONENTS WAS DRAGGED AND DROPPED TO A GRAPHICAL REPRESENTATION OF A PHYSICAL HOST DEVICE FROM AMONG THE PLURALITY OF PHYSICAL HOST DEVICES
708

BIND, BASED ON THE INDICATION, A DOWNSTREAM USB PORT TO WHICH THE COMPONENT IS CONNECTED TO A FIRST UPSTREAM USB PORT TO WHICH THE PHYSICAL HOST DEVICE IS CONNECTED
710

*FIG. 7*

BINDING DOWNSTREAM USB PORTS TO UPSTREAM USB PORTS

BACKGROUND

A display device such as a computer monitor may include or be coupled to multiple ports such as upstream universal serial bus (USB) ports to connect to different input sources. The input sources may include physical host devices such as desktop computers, laptop computers, and the like. The display device may also include or be coupled to multiple downstream USB ports to connect different components to the input sources. The components may include devices such as keyboards, mice, webcams, USB storage devices, and the like.

BRIEF DESCRIPTION OF THE DRAWINGS

Features of the present disclosure may be illustrated by way of example and not limited in the following figure(s), in which like numerals indicate like elements, in which.

DETAILED DESCRIPTION

For simplicity and illustrative purposes, the present disclosure may be described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" may be intended to denote at least one of a particular element. As used herein, the term "includes" means includes but not limited to, the term "including" means including but not limited to. The term "based on" means based at least in part on.

Various examples disclosed herein may relate to universal serial bus (USB) ports and connections, although the disclosure may be applied to other types of connections to switch any one of multiple components coupled to a display device to any one of multiple physical host devices coupled to the display device. For example, disclosed herein are apparatuses and methods for virtual USB port switching. In particular, an apparatus may assign downstream USB ports to different input sources such as physical host devices that may include laptop computers connected to a display device. An issue that may arise in a configuration in which multiple input sources are connected to a single display device may be that the display device may be unable to identify an input source to which devices connected to downstream USB ports are to be assigned. For example, the display device may assign all devices connected to downstream USB ports to a single input source based on which input source is supplying an active video input on an upstream USB port. To illustrate, the display device may assign a USB storage device connected to a downstream USB port to a desktop connected to a display device's upstream USB port instead of a laptop connected to another one of the monitor's upstream USB port because the desktop is currently supplying an active video input. The assignment based on the active video source may cause an issue when the user wishes to access data stored on the USB storage device from the laptop computer. Furthermore, although physical USB switches may be able to switch components from one input source to another, they may do so in a manner that all components are switched between input sources rather than allowing one component to be switched to one input source while another component is switched to another input source. Another issue may arise when components are moved between the input sources by manually switching physical connectors such as USB connectors, increasing wear and tear on the physical connectors.

An apparatus may provide dynamic, software-defined, switching of the downstream USB ports between multiple input sources, thereby virtualizing the switching of the downstream USB ports. A user may request such switching via depression of a keyboard shortcut key or other input. Responsive to the request, the apparatus may provide a graphical user interface (GUI) for switching the downstream USB ports between multiple input sources. To do so, the apparatus may detect devices connected to the downstream USB ports and input sources connected to the upstream USB ports of the display device. The apparatus may graphically represent the components and the input sources on the GUI. A user may drag-and-drop a graphical representation of a component to a graphical representation of an input source to associate the component with the input source. Other types of user inputs may be used as well. The apparatus may bind the downstream USB port with the upstream USB port responsive to the drag-and-drop operation. The binding of the downstream USB port with the upstream USB port may cause the component connected to the downstream USB port to be coupled to the input source (such as physical host device) connected to the upstream USB port via a USB connection. For example, the apparatus may route data signals via the USB connection from the component to the bound input source.

Through implementation of the features of the present disclosure, user and software-defined flexibility in switching components between different input sources may be facilitated when a single display device is connected to multiple input sources. This virtual assignment capability may improve efficiency of device switching and USB port allocation but may also reduce mechanical wear and tear of physical connectors such as USB connectors.

Figure 1:
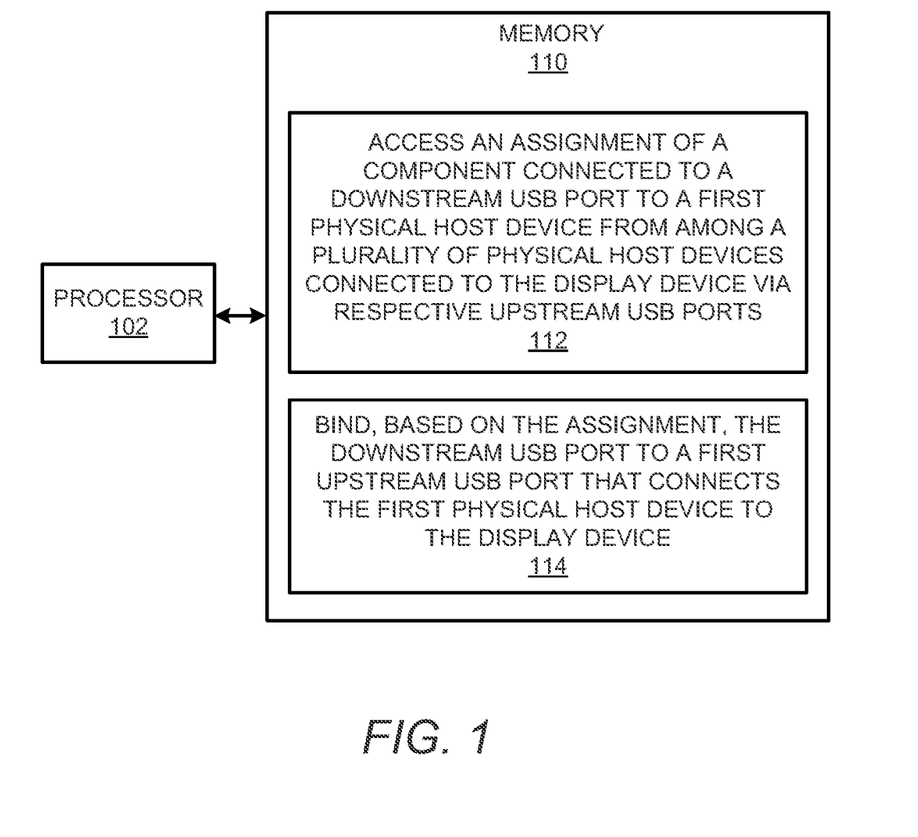
FIG. 1 shows a block diagram of an example apparatus that may assign components connected to a display device to one of a plurality of physical host devices that are also connected to the display device.
Figure 2:
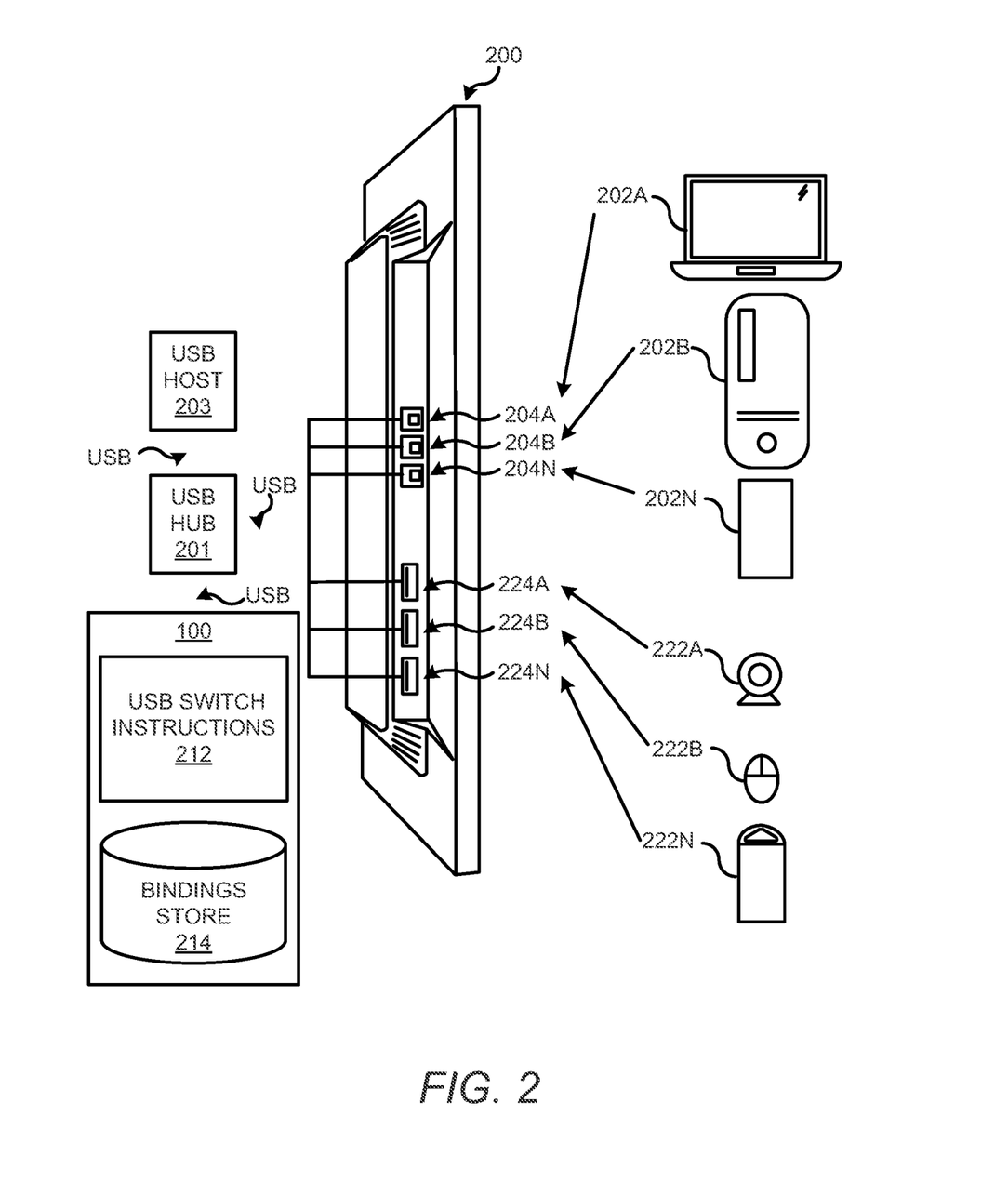
FIG. 2 shows a block diagram of example physical host device connections to a display device through upstream USB ports and example component connections to the display device through downstream USB ports.

Reference is first made to FIGS. 1 and 2. FIG. 1 shows a block diagram of an example apparatus 100 that may assign components connected to a display device (such as a display device 200 illustrated in FIG. 2) to one of a plurality of physical host devices that are also connected to the display device. FIG. 2 shows a block diagram of example physical host device 202A-N connections to a display device 200 through respective upstream USB ports 204A-N and example component 222A-N connections to the display device through respective downstream USB ports 224A-N. Although three upstream USB ports 204 and three downstream USB ports 224 are shown, other numbers of each may be used. In some examples, the physical host devices 202A-N may be connected to their respective upstream USB ports 204A-N via cabled USB connections such as a USB Type A connector cable, although other types of USB connections (including wireless USB connections) and other types of connections other than USB may be used. In some examples, the components 222A-N may be connected to their respective upstream USB ports 204A-N via cabled USB connections such as a USB Type B connector cable, although other types of USB connections (including wireless USB connections) and other types of connections other than USB may be used. Regardless of the types of upstream or downstream connections, the display device 200 may include a USB hub 201 (or other type of connection hub) that couples the upstream and downstream connections.

It should be understood that FIGS. 1 and/or 2 may include additional features and that some of the features described herein may be removed and/or modified without departing from the scopes of the features shown in FIGS. 1 and/or 2. As shown in FIG. 1, the apparatus 100 may include a processor 102 that may control operations of the apparatus 100. The processor 102 may be a semiconductor-based microprocessor, a central processing unit (CPU), an application specific integrated circuit (ASIC), a field-programmable gate array (FPGA), and/or other suitable hardware device. Although the apparatus 100 has been depicted as including a single processor 102, it should be understood that the apparatus 100 may include multiple processors, multiple cores, or the like, without departing from the scope of the apparatus 100 disclosed herein.

The apparatus 100 may include a memory 110 that may have stored thereon machine-readable instructions (which may also be termed computer readable instructions) 112-114 that the processor 102 may execute. The memory 110 may be an electronic, magnetic, optical, or other physical storage device that includes or stores executable instructions. The memory 110 may be, for example, Random Access memory (RAM), an Electrically Erasable Programmable Read-Only Memory (EEPROM), a storage device, an optical disc, and the like. The memory 110 may be a non-transitory machine-readable storage medium, where the term "non-transitory" does not encompass transitory propagating signals. Attention will now turn to operations at processor 102 to bind components 222 connected to a display device 200 to one of a plurality of physical host devices 202 that are also connected to the display device 200.

Referring to FIGS. 1 and 2, the processor 102 may fetch, decode, and execute the instructions 112 to access an assignment of a component 222 connected to a downstream USB port 224, from among a plurality of downstream USB ports 224A-N that are downstream of the display device 200, to a first physical host device 202 from among a plurality of physical host devices 202A-N connected to the display device 200 via respective upstream USB ports 204A-N. Such assignment may be based on a drag-and-drop operation or other input from a user via a graphical user interface (GUI), as will be described in further detail with respect to GUI 400 illustrated in FIGS. 4A, 4B and 5A-D.

The processor 102 may fetch, decode, and execute the instructions 114 to bind, based on the assignment, the downstream USB port 224 (such as a given one of the USB ports 224A-N) to a first upstream USB port 204 (such as a given one of the upstream USB ports 204A-N) that connects the first physical host device 202 to the display device 200. The binding may cause the component 222 to be coupled to the first physical host device 202. A binding may include a stored association between a downstream USB port 224 to an upstream USB port 204 to indicate that data from the downstream USB port 224 is to be routed to the upstream USB port 204. For example, a binding may include an identification of a downstream USB port 224 stored in association with (such as being stored as a pair, columns in a table row, etc.) an identification of a bound upstream USB port 204. The identification of a downstream USB port 224 may include a predefined USB port identifier and/or a component identifier assigned to a component 222 connected to the downstream USB port 224. The identification of an upstream USB port 204 may include a predefined USB port identifier and/or a physical host device identifier assigned to a physical host device 202 connected to the upstream USB port 204.

To illustrate enforcement of the bindings, reference will be made to FIGS. 2, 3A, and 3B. As illustrated in FIG. 2, the apparatus 100, USB hub 201 (of the display device 200), a USB host 203, component 222, and physical host devices 202 may be connected to one another via a USB connection. The USB host 203 may be integrated with the apparatus 100, the display device 200, or a physical host device 202. The USB host 203 may include a processor, such as processor 102, and/or other circuitry.

In an example, when a component 222 is connected to the USB hub 201, a USB host 203 may begin an enumeration process in which the component 222 may be registered for use by a physical host device 202. During the enumeration process, the USB host 203 may obtain, from the component 222, metadata that identifies a type of device for the component 222 and may assign a unique component identifier (such as a 7-bit address or other unique identifier) to uniquely identify the component 222. Data from the component 222 may be identified with the unique component identifier on the USB connection. The USB host 203 may execute the enumeration process for other components 222 connected downstream of the USB hub 201. The component identifiers for connected components 222 may be stored in the bindings store 214 and may be used instead of or in addition to identifications of downstream USB ports 224 in a given binding. In some examples, the USB hub 201 may store predefined identifiers for each of the upstream USB ports 204A-N. As such, each of the upstream USB ports 204A-N may be uniquely identified as well.

When an association between a component 222 (downstream USB port 224) and a physical host device 202 (upstream USB port 204) is made, the apparatus 100 may generate a binding between a downstream USB port 224A to an upstream USB port 204B. For example, the USB switch instructions 212 may cause a processor, such as processor 102, to generate an entry in the bindings store that associates an identification of the downstream USB port 224A with an identification of the upstream USB port 204B. It should be noted that the USB switch instructions 212 may include instructions 112-114 illustrated in FIG. 1 and/or other instructions described herein. The binding may associate the component identifier that identifies a component connected to downstream USB port 224A with the identifier of the upstream USB port 204B (or a physical host device identifier that identifies a physical host device 202 connected to the upstream USB port 204B for examples in which the physical host device identifier is assigned or is otherwise known). The binding may represent a USB path for data flow from a component 222 connected to a downstream USB port 224 to an upstream USB port 204 (and corresponding physical host device 202 connected to the upstream USB port 204). In this sense, the bindings store 214 may represent a USB data forwarding table that stores paths from a downstream USB port 224 to an upstream USB port 204.

In some examples, new bindings may be stored persistently in a bindings store 214 until deleted or modified. In some examples, existing bindings may be modified (updated) to reflect re-assignments of components 222 to physical host devices 202. The bindings store 214 may be stored at memory 110 or other storage accessible to the processor 102. For example, a downstream USB port 224 that is bound to an upstream USB port 204 may continue to be bound until the downstream USB port 224 is re-assigned. Thus, if a physical host device 202 connected to an upstream USB port 204 is no longer active, such as being turned off or in a standby state, any downstream USB ports 224 may remain bound to that upstream USB port 204 until the downstream USB port 224 is re-assigned. As such, if the physical host device 202 is re-activated (such as being turned back on or changing to an active state from a standby state), then the bindings to the corresponding upstream USB port 204 will remain. For example, inputs from a component 222 such as a mouse device may continue to be provided to its bound physical host device 202. Furthermore, in some examples, a binding may be created to an input source if the input source is active (such as an upstream USB port 204 that is connected to a currently active physical host device 202).

The bindings may be enforced according to various examples, given that the bindings store 214 may be made accessible to the display device 200, the physical host devices 202, and the apparatus 100 (which may be integrated with the display device 200 and/or the host devices 202 as will be described with reference to FIGS. 3A and 3B). In some examples, the apparatus 100 may implement software-defined switching that enforces the bindings so that data from the components 222 is forwarded to or used at corresponding physical host devices 202.

In some examples, a binding may signify an electrical path that is electrically switched between a downstream USB port 224 and an upstream USB port 204. For example, a binding may signify an electrical path through which data is to follow from a downstream USB port 224 to an upstream USB port 204. In this manner, data from a downstream USB port 224 may be forwarded (such as provided) to the upstream USB port 204 via the electrical path. In a particular example, the USB switch instructions 212 may include firmware of the apparatus 100 that may operate to electrically switch an electrical path from a given downstream USB port 224 to a corresponding one of the upstream USB ports 204 responsive to user assignments of components 222 to physical host devices 202.

The apparatus 100 may perform such electrical switching based on the binding that indicates that the upstream USB port 204 has been assigned to receive the data from the downstream USB port 224. In some examples, the electrical path may be modified or otherwise altered to connect the downstream USB port 224 with another upstream USB port 204. For example, if a user assigns a component 222A (connected at a downstream USB port 224A) to be connected to a physical host device 202A connected at an upstream USB port 204A, the apparatus 100 may bind the downstream USB port 224A to the upstream USB port 204A to signify that an electrical path be created between the downstream USB port 224A and the upstream USB port 204A. The apparatus 100 may create, via an electrically operated switch, an electrical path between the downstream USB port 224A and the upstream USB port 204A. Accordingly, when the physical host device 202A polls the USB connection, because the downstream USB port 224A and the upstream USB port 204A are electrically connected via the electrical path, data from the downstream USB port 224A may be forwarded by the apparatus 100 (and/or the USB hub 201) to the physical host device 202A via the upstream USB port 204A. If the user re-assigns the component 222A to be connected to a physical host device 202B connected at an upstream USB port 204B, the apparatus 100 may bind the downstream USB port 224A to the upstream USB port 204B to signify that the electrical path be created between the downstream USB port 224A and the upstream USB port 204B.

When the physical host device 202A polls the USB connection, because the downstream USB port 224A and the upstream USB port 204A may no longer (in some examples) be electrically connected via the electrical path, data from the downstream USB port 224A may not be forwarded to the physical host device 202A. On the other hand, when the physical host device 202B polls the USB connection, because the downstream USB port 224A and the upstream USB port 204B are now electrically connected via the electrical path, data from the downstream USB port 224A may be forwarded to the physical host device 202B (via the upstream USB port 204B). In yet another example, a downstream USB port 224 may be bound to no upstream USB port 204. In this example, the downstream USB port 224 may not be included in an electrical path with any of the upstream USB ports 204. In this sense, the apparatus 100 may unbind a previously bound downstream USB port 224 and upstream USB port 204 such that there is no longer an electrical path between the upstream USB port 204 and the downstream USB port 224. In a particular example, the downstream USB port 224 may be electrically connected to an electrical sink (not illustrated) that may not connect to a physical host device 202. It should be noted that other downstream USB ports 224 may be independently electrically switched to form electrical paths with any of the upstream USB ports 204. As such, components 222 connected to the downstream USB ports 224 may be individually assigned to upstream USB ports 204 and corresponding physical host devices 202. Furthermore, in some examples, a downstream USB port 224 may be electrically switched to form electrical paths with multiple upstream USB ports 204 simultaneously.

Examples of particular implementations will now be described with respect to particular integration locations of the apparatus 100. For example, the apparatus 100 may be integrated within the display device 200 as illustrated in FIG. 3A or may be a standalone device (e.g., separate from the display device) that connects components 222 to the physical host devices 202 via the USB hub 201 of the display device 200 as illustrated in FIG. 3B.

Figure 3A:
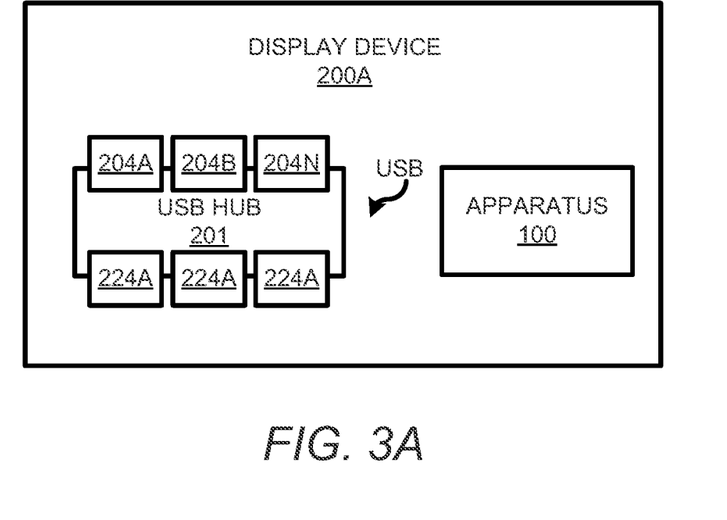
FIGS. 3A and 3B respectively show block diagrams of example configurations of the display device and apparatus shown in FIG. 2.

FIG. 3A shows a block diagram of an example configuration of the display device 200 and the apparatus 100 in which the apparatus 100 is integrated within the display device 200. In this example, the apparatus 100 (e.g., components of the apparatus 100 such as the processor 102) may be coupled to the USB hub 201 via an internal USB connection (labeled "USB" in FIG. 3A). In some examples, the USB hub 201 may include the upstream USB ports 204A-N and the downstream USB ports 224A-N. In these examples, the downstream USB ports 224A-N of the USB hub 201 may be connected to the apparatus 100 via the USB connection and the apparatus 100 may route signals upstream to appropriate upstream USB ports 204A-N based on the bindings.

In one example, the binding enforcement may occur at the display device 200 with the integrated apparatus 100. For example, a physical host device 202 connected to an upstream USB port 204 may poll, via USB hub 201, the USB connection (also referred to as a "bus" for illustration) for data traffic from connected components 222 on the bus. The USB switch instructions 212 may program a processor, such as processor 102, to access the polling and consult the bindings store 214 to identify any connected components 222 connected to downstream USB ports 224 that are bound to the upstream USB port 204 to which the physical host device 202 is connected. The USB hub 201 may return the data traffic of the identified components 222/downstream USB ports 224. In this manner, the USB switch instructions 212 may provide software-defined switching for the USB hub 201 to provide data switching from connected components 222 to bound upstream USB ports 204/physical host devices 202.

In some examples, the software defined switching may be implemented as a control signal to multiplexers (not illustrated) whose outputs are each connected to respective upstream USB ports 204 and whose inputs are each connected to the downstream USB ports 224. The control signal may selectively control which of the input signals from the downstream USB ports 224 are to be output based on the bindings. In this manner, the multiplexers may operate, in some examples, to electrically switch (such as form electrical paths between) downstream USB ports 224 to upstream USB ports 204. For example, a first multiplexer may be connected to the downstream USB ports 224A-N and to an upstream USB port 204A. A second multiplexer may be connected to the downstream USB ports 224A-N and to an upstream USB port 204B. A third multiplexer may be connected to the downstream USB ports 224A-N and to an upstream USB port 204N and so forth. If a downstream USB port 224A is bound to an upstream USB port 204B, the control signal from the USB switch instructions 212 may cause the second multiplexer to provide the data from the downstream USB port 224A to the upstream USB port 204B via an electrical path between the downstream USB port 224A and the upstream USB port 204B. Other configurations may be used as well, such as each downstream USB port 224 being individually switchable to various upstream USB ports 204 via an electric switch controlled by the apparatus 100 via software defined switching.

Figure 3B:
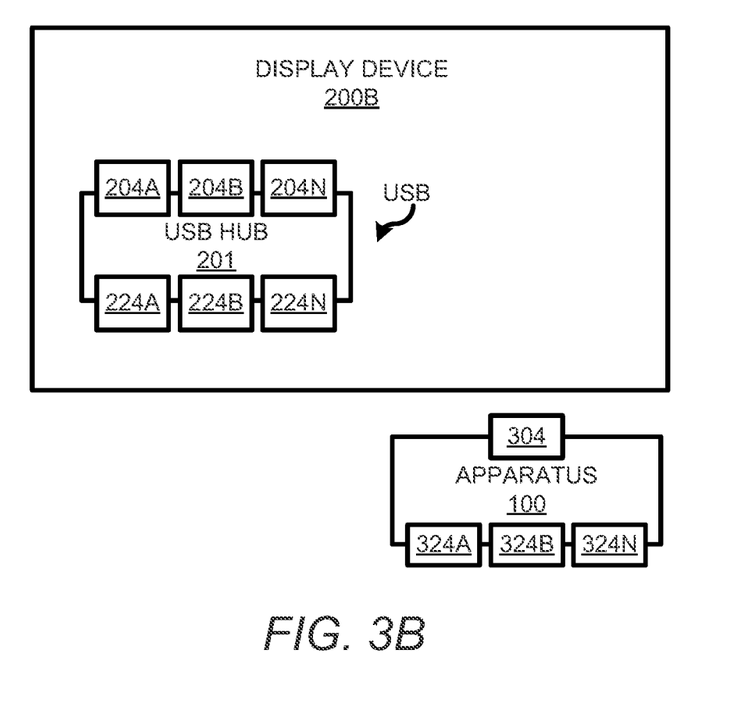

FIG. 3B shows a block diagram of an example configuration of the display device 200 and the apparatus 100 in which the apparatus 100 is housed separately from the display device 200. In some examples, the binding enforcement may occur at a physical host device 202. In these examples, the USB switch instructions 212 may operate as an agent operating at the physical host device 202. The agent may access the bindings (via onboard bindings store 214 or bindings store 214 located at the display device 200) and filter out (e.g., ignore or otherwise disregard) any data traffic of any connected components 222 that are not bound to the upstream USB port 204 to which the physical host device 202 is connected. As such, the software-defined switching may alternatively or additionally be implemented as a filter at each physical host device 202.

In some examples, the apparatus 100 may be configured as an external USB hub device that may be connected to the USB 201 of the display device 200 via an external USB connection (labeled "USB" in FIG. 3B) or may be integrated into a physical host device 202. In some examples, the apparatus 100 may include downstream USB ports 324A-324N and an upstream USB port 304. Although three downstream USB ports 324 and one upstream USB port 304 are shown, other numbers of each may be used. The upstream USB port 304 may be connected to the USB hub 201 via a downstream USB port 224 via a USB cable or other type of connection to form a USB network. It should be understood that the upstream USB port 304 may be connected to an upstream USB port 204 if a bi-directional USB connection is used. Various components (such as the components 222 illustrated in FIG. 2) may each be connected to respective downstream ports 324, similar to the manner in which the components 222 may be connected to respective downstream ports 224. The apparatus 100 may route data from the downstream USB ports 324 to appropriate upstream USB ports 204 based on the bindings described herein. For example, the apparatus 100 may identify the upstream USB port 204 to which the data from the apparatus 100 is to be transmitted. The USB hub 201 may forward the data to the appropriate upstream USB 204 as appropriate.

Figure 4A:
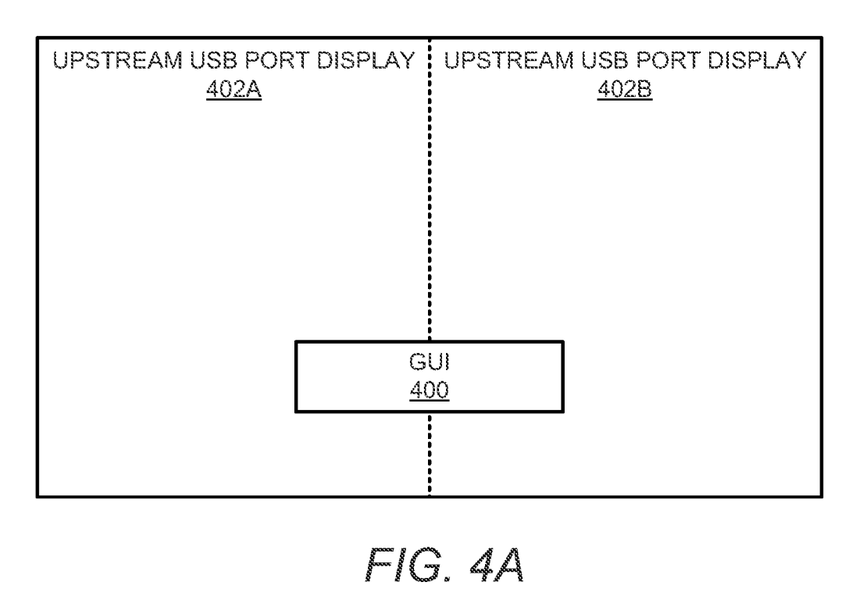
FIG. 4A shows a diagram of an example split screen display of upstream USB port displays.

FIG. 4A shows a diagram of an example split screen display of upstream USB port displays 402A-B. The display device 200 may display the split screen display (which is illustrated in FIG. 2). Although a two-display split screen display is shown, other numbers of screens may be split depending on, for instance, the number of physical host devices 202 that are connected to respective upstream USB ports 204. In this example, a physical host device 202A may be connected to upstream USB port 204A and a physical host device 202B may be connected to upstream USB port 204B. The display device 200 may split its display screen to display video data (in other words, visual data used to generate a display) from the physical host device 202A through upstream USB port display 402A and video data from the physical host device 202B through upstream USB port display 402B. In this manner, the user may simultaneously view the displays of each of the physical host devices 202A and 202B connected to the display device 200. In these examples, the display device 200 may display a GUI 400 in the middle of the split display as shown, or other location such as in one of the upstream USB port displays 402A-B. The GUI 400 may be used to receive assignments of components 222 to physical host devices 202, as will be described with respect FIGS. 5A-D.

Figure 4B:
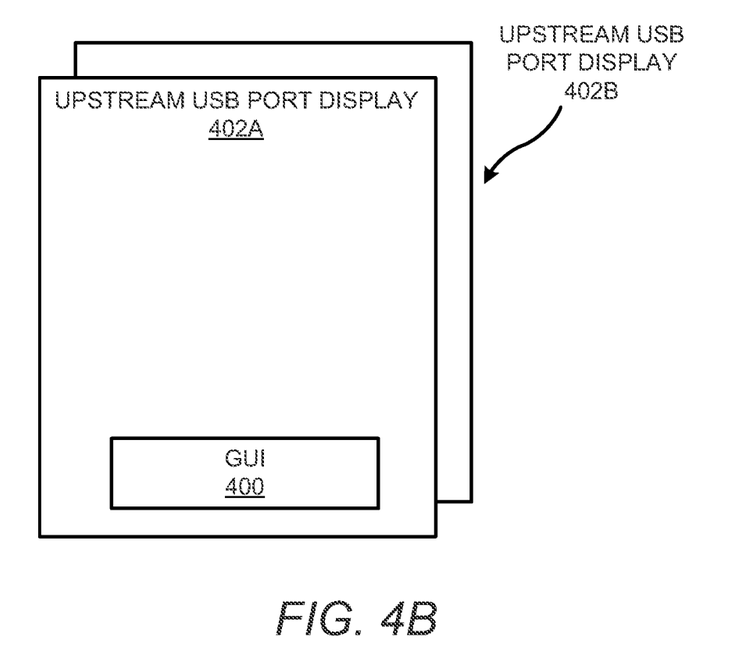
FIG. 4B shows a diagram of example switchable upstream USB port displays.

FIG. 4B shows a diagram of example switchable upstream USB port displays 402A-B. In these examples, the display device 200 may provide one of the upstream USB port displays 402A-B at a time and the user may switch between the different displays. For example, the display device 200 may provide a display based on the video data from the physical host device 202A and not the video from the physical host device 202B and may switch between the two (or other number) automatically based on active video status and/or manually based on user input. The display device 200 may provide the GUI 400 in whichever one of the upstream USB port displays 402A-B is being shown. It should be noted that other display examples may be used as well, such as a picture-in-picture in which one of the upstream USB port displays 402A-B is displayed within another, or windowed displays in which each of the USB port displays 402A-B is displayed within individual movable windows about the screen.

In either of the examples illustrated in FIGS. 4A and 4B or other display examples, the display device 200 may persistently display the GUI 400 or may display the GUI 400 responsive to a user request to do so. For example, the display device 200 may access a user input such as a keyboard shortcut key or other user input to provide the GUI 400 (because the user may wish to change the assignments/bindings of the components 222). It should also be noted that the display device 200, the apparatus 100, and/or the physical host devices 202 may provide the GUI 400.

FIGS. 5A-5D respectively show block diagrams of an example graphical user interface 400 for switching component 222 assignments to one of the plurality of physical host devices 202. The description of FIGS. 5A-5D discuss that the apparatus 100 may generate the GUI 400 for illustration and not for limitation. Other system components (such as the display device 200 or the physical host devices 202) may generate the GUI 400. In some examples, the apparatus 100 may generate the GUI 400 responsive to a request to assign components 222 connected to respective downstream USB ports 224 to corresponding physical host devices 202.

To generate the GUI 400, the apparatus 100 may detect components 222 connected to respective downstream USB ports 224, such as by using USB device detection protocols. The apparatus 100 may detect physical host devices 202 connected to respective upstream USB ports 204. The apparatus 100 may generate graphical representations of each of the components 222 and the physical host device 202. The graphical representations may include any visual shape or indicator that may be displayed and individually discerned from other graphical representations. In some examples, the apparatus 100 may access metadata such as device descriptors that identify the detected component 222 or physical host device 202. The metadata may be based on a type identifier from the detected component 222 or physical host device 202 that indicates the type of device. In these examples, the apparatus 100 may generate the graphical representation to include an icon or thumbnail representation of the component 222 or physical host device 202. In some examples, the type of physical host device 202 may not be detected. In these examples, the graphical representation 502 may simply be a representation of a corresponding upstream USB port 204. The apparatus 100 may cause the GUI 400 to be displayed, which may be responsive to a user request to assign components 222 connected to respective downstream USB ports 224 to corresponding physical host devices 202. The GUI 400 may include the graphical representations.

Figure 5A:
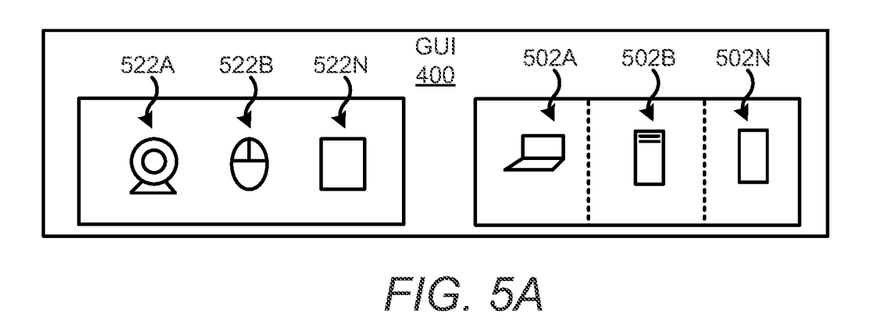
FIGS. 5A-5D respectively show block diagrams of an example graphical user interface for switching component assignments to one of the plurality of physical host devices.

For example, the GUI 400 may include a graphical representation 522A that graphically represents a component 222A (such as a webcam) connected to and detected at a downstream USB port 224A, a graphical representation 522B that graphically represents a component 222B (such as a mouse device) connected to and detected at a downstream USB port 224B, a graphical representation 522N that graphically represents a component 222N (such as a USB storage device) connected to and detected at a downstream USB port 224N. The apparatus 100 may detect and graphically represent other types and numbers of components 222 as well. The GUI 400 may further include a graphical representation 502A that graphically represents a physical host device 202A (such as a laptop computer) connected to and detected at an upstream USB port 204A (or simply graphically represents upstream USB port 204A), a graphical representation 502B that graphically represents a physical host device 202B (such as a desktop computer) connected to and detected at an upstream USB port 204B (or simply graphically represents upstream USB port 204B), a graphical representation 502N that graphically represents a physical host device 202N connected to and detected at an upstream USB port 204N (or simply graphically represents upstream USB port 204N), or the like. The apparatus 100 may detect and graphically represent other types and numbers of physical host devices 202 or upstream USB ports 204 as well. It should be noted that the examples that follow describe graphical representations 502 of physical host devices 202; however, the graphical representations 502 may refer to graphical representations of upstream USB ports 204.

The GUI 400 may receive an association between a graphical representation 522 of a component 222 and a graphical representation 502 of a physical host device 202. For example, the association may include a user input such as a drag-and-drop that associates a graphical representation 522 and a graphical representation 502. The apparatus 100 may access the association, via the GUI 400, and may assign the corresponding component 222 to a corresponding physical host device 202. Based on the assignment, the apparatus 100 may bind the corresponding downstream USB port 224 to which the component 222 is connected with the corresponding upstream USB port 204 to which the physical host device 202 is connected.

Figure 5B:
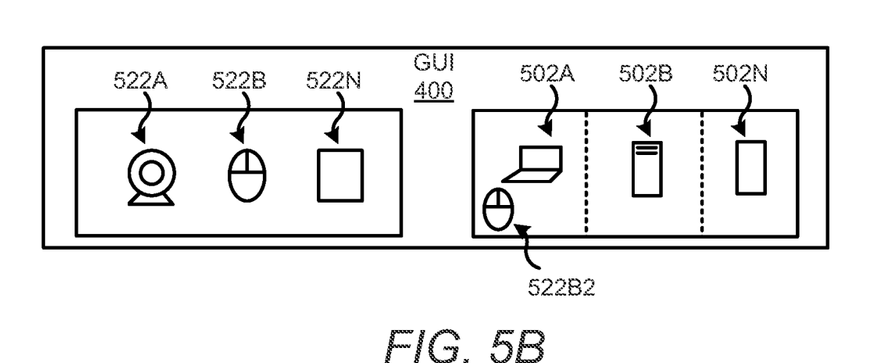

To illustrate, a user may drag-and-drop a graphical representation 522B of a component 222B (such as a mouse device) to a graphical representation 502A of a physical host device 202A (such as a laptop device). Referring to FIG. 5B, the GUI 400 may display an association between a copy or version of the graphical representation 522B (illustrated as graphical representation 522B2) and the graphical representation 502A to depict the assignment of the component 222B to the physical host device 202A and underlying binding of the downstream USB port 224B to the upstream USB port 204A. In this example, the component 222B may be used to provide input to the physical host device 202A.

Figure 5C:
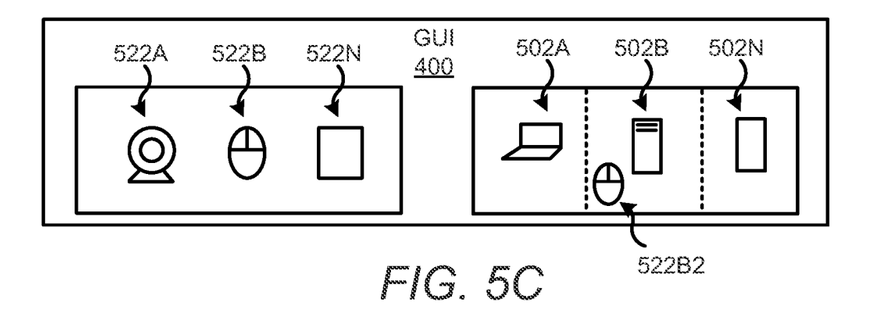

In some examples, the component 222B may be re-assigned to another physical host device, such as physical host device 202B. In a particular example, the user may drag-and-drop the graphical representation 522B or 522B2 to the graphical representation 502B so that the component 222B is re-assigned to the physical host device 202B corresponding to the graphical representation 502B, as illustrated in FIG. 5C. In some examples, a given component 222 may be assigned to one of the physical host devices 202 at a given time. In other instances, a given component 222 may be assigned to two or more of the physical host devices 202 simultaneously, in which case re-assignment may occur by dragging and dropping graphical representation 522B2.

Figure 5D:
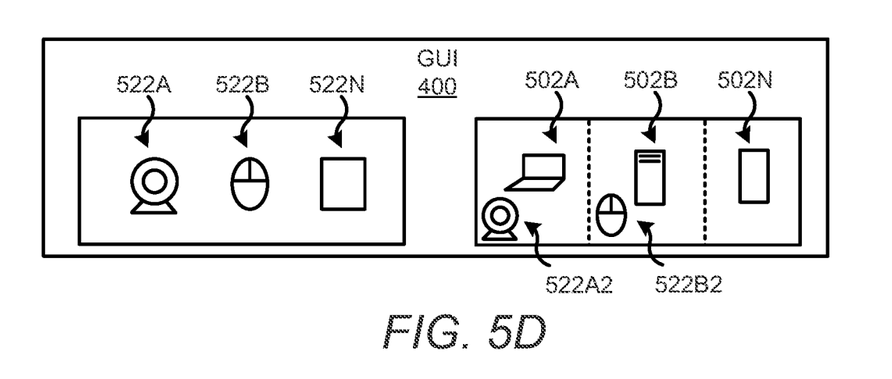

In some examples, different components 222 may be assigned to different physical host devices 222 as well. For example, as illustrated in FIG. 5D, a second graphical representation 522A of a second component 222A may be dragged and dropped to a graphical representation 502A of a physical host device 202. A graphical representation 522A2 may be displayed in association with graphical representation 502A to indicate the assignment of the component 222A with the physical host device 202A. Thus, component 222A connected to the display device 200 via downstream USB port 224A may be connected to a physical host device 202A and component 222B connected to the display device 200 via downstream USB port 224B may be connected to a physical host device 202B.

In some examples, the apparatus 100 may provide a graphical representation 502 for upstream USB ports 204 that are receiving an active video signal that includes video data. In these examples, the apparatus 100 may not provide a graphical representation 502 for upstream USB ports 204 connected to physical host devices 202 that are not providing an active video signal (such as physical host devices that are in "sleep" mode or otherwise not providing an active video signal).

Figure 6:
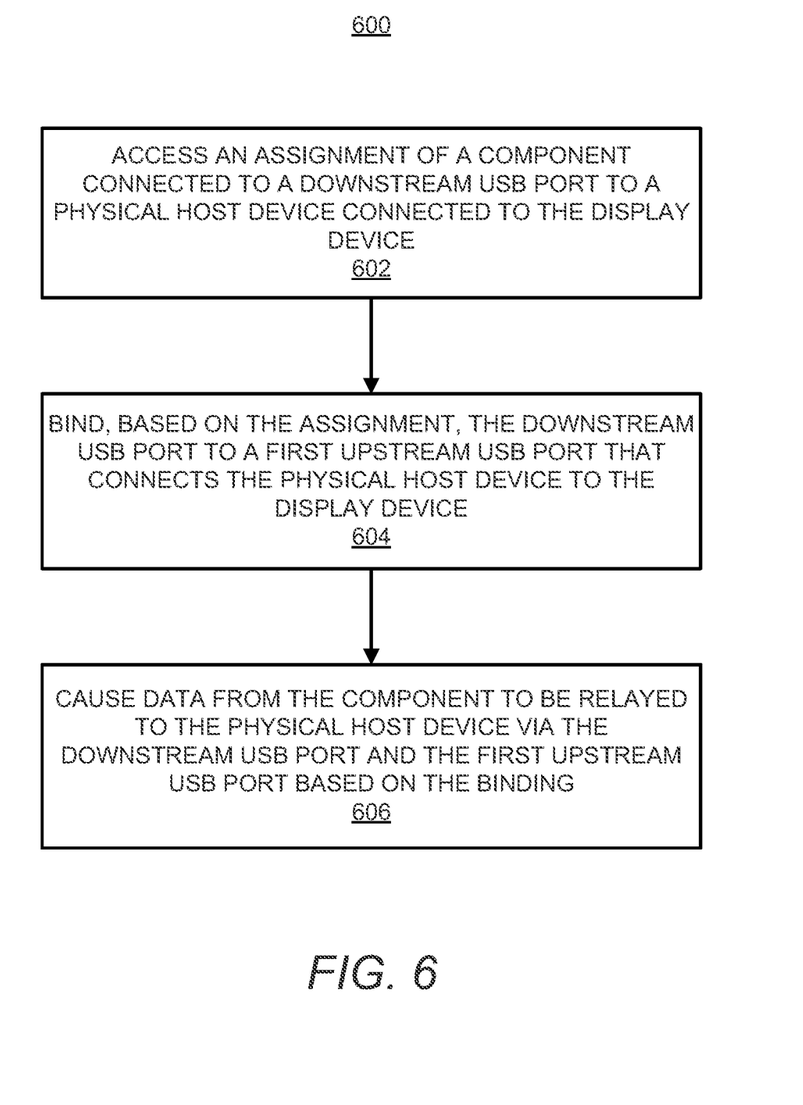
FIG. 6 depicts a flow diagram of an example method for assigning components connected to a display device to one of a plurality of physical host devices that are also connected to the display device.

Various manners in which the apparatus 100 may operate are discussed in greater detail with respect to the method 600 depicted in FIG. 6. It should be understood that the method 600 may include additional operations and that some of the operations described therein may be removed and/or modified without departing from the scopes of the method 600. The description of the method 600 may be made with reference to the features depicted in FIGS. 1-5 for purposes of illustration.

FIG. 6 depicts a flow diagram of an example method 600 for assigning components (such as components 222A-N illustrated in FIG. 2) connected to a display device (such as display device 200) to one of a plurality of physical host devices (such as physical host devices 202A-N) that are also connected to the display device.

As shown in FIG. 6, at block 602, the processor 102 may access an assignment of a component connected to a downstream universal serial bus (USB) port, from among a plurality of downstream USB ports that are downstream of a display device, to a physical host device from among a plurality of physical host devices connected to the display device via respective upstream USB ports. At block 604, the processor 102 may bind, based on the assignment, the downstream USB port to a first upstream USB port that connects the physical host device to the display device. At block 606, the processor 102 may cause data from the component to be relayed to the physical host device via the downstream USB port and the first upstream USB port based on the binding.

Some or all of the operations set forth in the method 600 may be included as utilities, programs, or subprograms, in any desired computer accessible medium. In addition, the method 600 may be embodied by computer programs, which may exist in a variety of forms. For example, some operations of the method 600 may exist as machine-readable instructions, including source code, object code, executable code or other formats. Any of the above may be embodied on a non-transitory computer readable storage medium. Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 7:
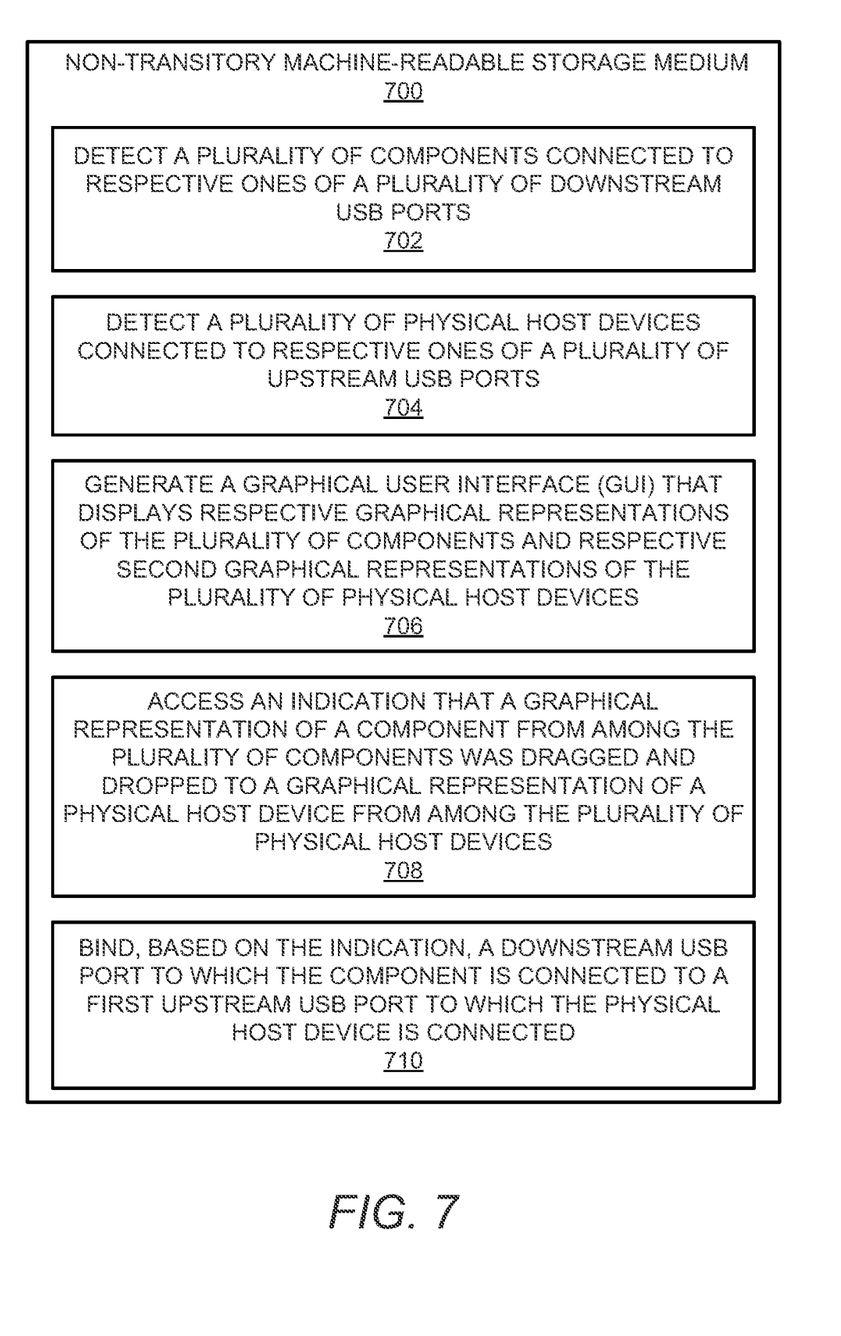
FIG. 7 depicts a block diagram of an example non-transitory machine-readable storage medium for assigning components connected to a display device to one of a plurality of physical host devices that are also connected to the display device.

FIG. 7 depicts a block diagram of an example non-transitory machine-readable storage medium for assigning components connected to a display device to one of a plurality of physical host devices that are also connected to the display device. The non-transitory machine-readable storage medium 700 may be an electronic, magnetic, optical, or other physical storage device that includes or stores executable instructions. The non-transitory machine-readable storage medium 700 may be, for example, Random Access memory (RAM), an Electrically Erasable Programmable Read-Only Memory (EEPROM), a storage device, an optical disc, and the like. The non-transitory machine-readable storage medium 700 may have stored thereon machine-readable instructions 702-710 that a processor, such as the processor 102, may execute.

The machine-readable instructions 702 may cause the processor to detect a plurality of components connected to respective ones of a plurality of downstream USB ports.

The machine-readable instructions 704 may cause the processor to detect a plurality of physical host devices connected to respective ones of a plurality of upstream USB ports. The machine-readable instructions 706 may cause the processor to generate a graphical user interface (GUI) that displays respective graphical representations of the plurality of components and respective second graphical representations of the plurality of physical host devices. The machine-readable instructions 708 may cause the processor to access an indication that a graphical representation of a component from among the plurality of components was dragged and dropped to a graphical representation of a physical host device from among the plurality of physical host devices. The machine-readable instructions 710 may cause the processor to bind, based on the indication, a downstream USB port to which the component is connected to a first upstream USB port to which the physical host device is connected. The binding may cause the component to be coupled to the physical host device via a USB connection between the downstream USB port and the upstream USB port.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:
a processor; and
a non-transitory computer readable medium on which is stored instructions that when executed by the processor, are to cause the processor to:
detect a plurality of components connected to respective ones of a plurality of downstream USB ports;
detect a plurality of physical host devices connected to respective ones of a plurality of upstream USB ports;
generate a graphical user interface (GUI) that displays respective graphical representations of the plurality of components and respective second graphical representations of the plurality of physical host devices;
access an assignment of a component connected to a downstream universal serial bus (USB) port, from among a plurality of downstream USB ports that are downstream of a display device, to a first physical host device from among a plurality of physical host devices connected to the display device via respective upstream USB ports; and
bind, based on the assignment, the downstream USB port to a first upstream USB port that connects the first physical host device to the display device,
wherein the binding causes the component to be coupled to the first physical host device.

2. The apparatus of claim 1, wherein the first physical host device, the display device, and the component are coupled to one another via a USB connection through the downstream USB port and the first upstream USB port.

3. The apparatus of claim 1, wherein to access the assignment, the instructions are further to cause the processor to:
   access, via the graphical user interface (GUI) that displays a first representation of the component and a second representation of the first physical host device, a user input that associates the first representation and the second representation.

4. The apparatus of claim 1, wherein the instructions are further to cause the processor to:
   access a re-assignment of the component to a second physical host device from among the plurality of physical host devices; and
   bind, based on the re-assignment, the downstream USB port to a second upstream USB port that connects the second physical host device to the display device,
   wherein the binding of the downstream USB port to the second upstream USB port causes the component to be coupled to the second physical host device instead of the first physical host device.

5. The apparatus of claim 1, wherein the component is coupled to one of the plurality of physical devices at a given time.

6. The apparatus of claim 1, wherein the first physical host device comprises a source device that provides visual data to the display device, and the component comprises a peripheral device to provide input to the source device.

7. The apparatus of claim 1, wherein the apparatus comprises a standalone device separate from the display device.

8. The apparatus of claim 7, wherein the downstream USB port is connected to a USB hub of the display device.

9. The apparatus of claim 7, further comprising some or all of the plurality of downstream USB ports.

10. The apparatus of claim 1, wherein the binding causes an electrical path to be created between the downstream USB port and the first upstream USB port to couple the component to the first physical host device.

11. The apparatus of claim 1, wherein the apparatus is integrated with the display device.

12. A method comprising:
   accessing, by a processor, an assignment of a component connected to a downstream universal serial bus (USB) port, from among a plurality of downstream USB ports that are downstream of a display device, to a physical host device from among a plurality of physical host devices connected to the display device via a respective plurality of upstream USB ports;
   binding, by the processor, based on the assignment, the downstream USB port to a first upstream USB port that connects the physical host device to the display device;
   causing, by the processor, data from the component to be relayed to the physical host device via the downstream USB port and the first upstream USB port based on the binding;
   accessing a request to assign components connected to respective downstream USB ports to corresponding physical host devices;
   detecting a plurality of components, including the component, connected to respective ones of the plurality of downstream USB ports;
   detecting a plurality of physical host devices, including the physical host device, connected to respective ones of the plurality of upstream USB ports;
   causing a graphical user interface (GUI) to be displayed responsive to the request, wherein the GUI displays respective graphical representations of the plurality of components and respective second graphical representations of the plurality of physical host devices; and
   accessing an association between a graphical representation of the component and a graphical representation of the physical host device, wherein the assignment is based on the association between the graphical representation of the component and the graphical representation of physical host device.

13. A non-transitory computer readable medium on which is stored machine readable instructions that when executed by a processor, cause the processor to:
   detect a plurality of components connected to respective ones of a plurality of downstream USB ports;
   detect a plurality of physical host devices connected to respective ones of a plurality of upstream USB ports;
   generate a graphical user interface (GUI) that displays respective graphical representations of the plurality of components and respective second graphical representations of the plurality of physical host devices;
   access an indication that a graphical representation of a component from among the plurality of components was dragged and dropped to a graphical representation of a physical host device from among the plurality of physical host devices; and
   bind, based on the indication, a downstream USB port to which the component is connected to a first upstream USB port to which the physical host device is connected,
   wherein the binding causes the component to be coupled to the physical host device via a USB connection between the downstream USB port and the upstream USB port.

14. The non-transitory computer readable medium of claim 13, wherein the machine readable instructions that when executed by the processor, further cause the processor to:
   receive an input from the component via the downstream USB port; and
   route the input to the physical host device via the upstream USB port based on the binding.

* * * * *